United States Patent [19]
Burch et al.

[11] Patent Number: 5,310,824
[45] Date of Patent: May 10, 1994

[54] WATER REPELLENT ARAMIDS

[75] Inventors: Robert R. Burch, Exton, Pa.; David P. Higley; James G. Lertola, both of Wilmington, Del.

[73] Assignee: E. I. Du Pont de Nemours and Company, Wilmington, Del.

[21] Appl. No.: 801,919

[22] Filed: Dec. 3, 1991

[51] Int. Cl.[5] .............................................. C08G 69/48
[52] U.S. Cl. .................................... 525/420; 264/343; 264/DIG. 80; 428/224; 428/288
[58] Field of Search ...................... 264/343, DIG. 80; 525/420; 428/224, 288

[56] References Cited

U.S. PATENT DOCUMENTS

| | | | |
|---|---|---|---|
| 4,889,579 | 12/1989 | Burch | 156/305 |
| 4,894,422 | 1/1990 | Peiffer et al. | 525/420 |
| 5,024,858 | 6/1991 | Burch | 427/123 |

FOREIGN PATENT DOCUMENTS

| | | | |
|---|---|---|---|
| 62-81426 | 3/1987 | Japan | C08J 7/12 |
| 62-91542 | 4/1987 | Japan | C08J 7/12 |
| 62-110968 | 5/1987 | Japan | D06M 3/30 |

OTHER PUBLICATIONS

Macromolecules, vol. 23, No. 4 (1990), pp. 1065–1072, "Preparation of Aromatic Polyamide Polyanions: A Novel Processing Strategy For Aromatic Polyamides", by R. R. Burch et al.

Acc. Chem. Res., vol. 21, (1988), pp. 456–463, "Equilibrium Acidities in Dimethyl Sulfoxide Solution", R. G. Bordwell.

Primary Examiner—John Kight, III
Assistant Examiner—Richard Jones

[57] ABSTRACT

A process is disclosed for rendering shaped aramid and polybenzimidazole articles water repellent by grafting fluorinated compounds to the surface of the articles. The resulting grafted polymer and shaped articles made from the grafted polymer are also disclosed.

9 Claims, No Drawings

WATER REPELLENT ARAMIDS

BACKGROUND OF THE INVENTION

1. Field of the Invention

This invention relates to polymer and shaped aramid and polybenzimidazole articles which exhibit an inherent water repellency and to a process for making such inherently water repellent aramid and polybenzimidazole articles. The articles include fibers; and the process for increasing the water repellency of the articles includes a reaction wherein fluoroalkyl groups are grafted onto the surface of the polymer.

2. Description of the Prior Art

Japanese Publication (Kokai) No. 62-81426, published Apr. 14, 1987 on the application of Asahi, discloses a process for treating aramid surfaces to render them more hydrophobic and decrease the coefficient of moisture absorption. The process includes: contact of the aramid surface by alkali metal hydrocarbyls or alkaline earth metal hydrocarbyls in no solvent or in a solvent specifically required to be less polar than dimethyl sulfoxide; and then contact of the metallated aramid by a halogenated aliphatic compound in no solvent or in a solvent specifically required to be less polar than dimethyl sulfoxide. There is no mention of the use of fluoroalkyl-containing alkylating agents.

Japanese Patent No. Sho 62-91542, published Apr. 27, 1987 on the application of Asahi, discloses a process for treating aramid surfaces to render them more hydrophilic and increase the coefficient of moisture absorption. The process includes: contact of the aramid surface by alkali metal-containing or alkaline earth metal-containing compounds in a solvent specifically required to be at least as polar as dimethyl sulfoxide; and then, reacting the aramid surface with water or other polar compound.

Japanese Publication (Kokai) No. 62-110,968, published May 22, 1987, discloses grafting materials to aramid fibers, through the use of epoxide-functional grafting agents, to create a surface with reactive epoxide groups.

SUMMARY OF THE INVENTION

The present invention provides a process for increasing the water repellency of shaped aramid and polybenzimidazole articles comprising the steps of: contacting the articles with a solution of an alkyl sulfoxide solvent, a base whose conjugate acid has a $pK_a$ in the alkyl sulfoxide solvent of at least 19, and a lithium salt; maintaining the contact for a time sufficient to swell the surface of the articles and form anions on polymer molecules on the surface of the articles; optionally, rinsing the articles to remove the base and excess lithium salt; and, then, contacting the articles with a fluoroalkyl-containing alkylating agent such as a perfluoroalkyl benzyl halide or a perfluoro alkyl epoxide. The lithium ion has been found to prevent individual articles from adhering to each other.

The fluoroalkyl-containing alkylating agent is $R'(CH_2)_mX$ wherein:

R' is a perfluoroalkyl having 1-20 carbon atoms, straight-chain or branched, and substituted by one or more ether oxygens or not;

m is 0-6; and

X is $-CH[O]CH_2$, $-OCH_2CH[O]CH_2$, or $-C_6H_4CH_2Y$ wherein Y is Br, Cl, I, $CH_3C_6H_4SO_3$, or $CF_3SO_3$.

The process utilizes base in a concentration of 0.0001 to 6 molar in the solution and lithium salt in a concentration of 0.0001 to 6 molar in the solution. The preferred concentration range for both materials is from 0.1 to 1.0 molar in the solution.

The solvent for the solution is generally an alkyl sulfoxide such as dimethyl sulfoxide or tetramethylene sulfoxide or combinations of those solvents alone or combined with polar non-protic solvents. The base is generally potassium tert-butoxide, sodium methoxide, potassium hydride, sodium hydride, potassium hydroxide, or sodium amide; and the lithium salt is generally lithium nitrate, lithium iodide, lithium chloride, and the like provided only that the salt is soluble and does not have acidic counterions. The base and the lithium salt can be constituted from a single material. For example $LiN(Me)_2$ (lithium dimethyl amide) is both, adequate base and soluble lithium salt.

This invention also provides aramid and polybenzimidazole polymers with fluoro alkyl moieties grafted thereto and shaped articles containing such polymers.

DETAILED DESCRIPTION OF THE INVENTION

Aramid fibers and other shaped aramid articles have found many important uses requiring high strength, high modulus, high heat resistance, and other similar high performance qualities. It is sometimes desirable for the shaped aramid articles to exhibit a durable water repellent surface. This invention provides shaped aramid articles with a water repellent surface which is an integral part of the aramid molecular surface of the article.

"Shaped articles", as used herein, is intended to include fibers, ribbons, tapes, rods, particles, and structures made from such materials. As used herein, the words "fiber", "filament", and "shaped articles" shall all be taken to mean shaped articles. Shaped articles also is intended to include articles which might be molded or cast having a geometric shape.

The present invention relates to the use of aramid and polybenzimidazole polymer materials.

By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled "Fiber-Forming Aromatic Polyamides", page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The polymer used in fibers of this invention includes aramids and polybenzimidazole and is a polymer having at least one repeating unit selected from the group: —NHRCO—, $R^1$—NHCONH—or

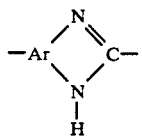

wherein

R is selected from $R^3$ and $R^1NHCOR^2$, $R^1$ and $R^3$, individually, are selected from m-phenylene, p-phenylene, 3,3'-biphenylene, 3,4'-biphenylene, 4,4'-biphenylene and 4,4'-diphenylene ether, $R^2$ is selected from $R^1$ an $(CH_2)_x$—, Ar is a trisubstituted aromatic radical in which two of the three radical bonds are adjacent to one another and attached to nitrogen atoms, and x is 1 to 10, preferably 1 to 4; said repeating unit further optionally substituted with halogen or $C_yH_{2y+1}$ where y is 1 to 10.

The process of the present invention includes grafting an accessible nitrogen anion to a fluoroalkyl-containing alkylating agent. The accessible nitrogen anions can be in solution or solvent swollen or, in some cases, merely wetted by the liquid solution of alkylating agent. The process of the present invention more specifically includes swelling the polymer, creating anionic reactive sites on the swollen polymer, treating the reactive polymer surface to render it non-tacky, and grafting water repellent moieties to the anionic reactive sites.

The polymer is swollen by a highly polar solvent. Solvents which are suitable for the invention include sulfoxides such as $R^4SOR^5$ wherein $R^4$ and $R^5$ can be the same or different or joined together to yield a solvent with a cyclic structure, and are $C_1$-$C_5$ alkyl. The most preferred solvent is dimethylsulfoxide (DMSO).

Solvent and solvent mixtures which are suitable include $R^4SOR^5$ mixed with a polar non-protic solvent such as N-methylpyrrolidone or tetrahydrofuran. Preferred solvent mixtures contain greater than 10% DMSO. Most preferred solvent mixtures contain greater than 50% DMSO. It is important to the present invention that the combination of base and solvent cause swelling of the polymer, as this permits improved contact with the reagents. Solvents and solvent combinations which cause swelling are known in the art. See U.S. Pat. No. 4,785,038.

Reactive anionic sites are created on the swollen polymer by reaction of the polymer with a strong base. The strength of a base useful to create anionic sites on the polymer must be greater, in the solvent system being used, than the strength of the nitrogen group itself in that solvent. For example, it is estimated that poly(paraphenylene terephthalamide) exhibits a $pK_a$ in DMSO of about 29. (See *Macromolecules*, vol 23, pp 1065-71 (1990)). As a consequence, any base whose conjugate acid has a $pK_a$ in DMSO greater than 29 should be effective to create a full complement of anionic reactive sites on the swollen poly(paraphenylene terephthal amide) polymer. Under the same conditions, a base whose conjugate acid has a $pK_a$ of greater than 19 should be effective to convert more than 50% of the amine sites to anionic reaction sites and it has been estimated that more than 50% conversion is adequate for practice of this invention. Examples of such bases include potassium tert-butoxide (conjugate acid is tert-butyl alcohol, $pK_a=32$ in DMSO), sodium methoxide (methanol, $pK_a=29$), potassium hydroxide (water, $pK_a=32$), and sodium amide (ammonia, $pK_a=41$).

Such bases are also effective for deprotonation of poly(meta-phenylene isophthalamide) and poly(1,4-benzamide) in DMSO. As is understood, the relative strengths of acids and bases may differ with different solvent systems, thus changing the adequacy or eligibility of certain bases for use in practice of this invention. A convenient listing of equilibrium acidities for materials in DMSO can be found in Accounts of Chemical Research, Vol. 21, pp. 456-463 (1988).

While bases can be used at any concentration for some benefit, it has generally been found that at least 1 mole of the base should be present in the system for each 100 moles of accessible amide anions, as a lower limit. As much as one mole of base for each mole of amide anions can be used, with very little benefit for base concentrations in excess of their solubility limit in the system.

Salts of lithium have been discovered to alter the swollen anionic polymer surface in such a way as to render it non-tacky and permit treatment of closely adjacent surfaces without adherence of the polymer articles to themselves and each other. While the reason for the effect of the lithium salts is not entirely understood, it is believed that any lithium salt which has a non-acidic counterion and is soluble in the solvent system is eligible for use in the practice of the present invention. Polymer surfaces, once swollen by the sulfoxide solvents and reacted by the added bases, tend to become tacky and stick together even while immersed in the solvent system; for example, as described in U.S. Pat. No. 4,889,579. It has now been discovered that addition of a soluble lithium salt to the system causes an alteration in the surface of the swollen polymer such that the reactive sites remain available for the up-coming grafting reaction but the aramid article, itself, will not readily adhere to neighboring articles. Non-tacky surfaces are especially important to prevent filament-to-filament adhesion in yarns.

The concentration of lithium salt to be used in the practice of this invention can vary from as little as 1:1 to as much at 2:1 or more, by mole, of lithium to base, to obtain adequate reduction in tackiness of the aramid substrate. Less lithium can be used if tackiness is unimportant or less important for any reason. Beyond a mole ratio of 2:1 for lithium to base, there is very little improvement in effect.

The fluoroalkyl alkylating agents which are grafted to the anionic aramid sites include perfluoroalkyl benzylhalides, fluoroalkyl epoxides, and the like in conformance with the following formula:

$R'(CH_2)_mX$ wherein:

R' is a perfluoroalkyl having 1-20 carbon atoms, straight-chain or branched, and substituted by one or more ether oxygens or not;

m is 0-6; and

X is —CH[O]$CH_2$, —OCH$_2$CH[O]CH$_2$, or —C$_6$H$_4$CH$_2$Y wherein Y is Br, Cl, I, CH$_3$C$_6$H$_4$SO$_3$, or CF$_3$SO$_3$.

A broad range of fluoroalkyl alkylating agent concentrations can be used in the practice of this invention. For example, at one extreme, a concentration of as little as 0.01 mole of agent per mole of amide anion has been found to yield a convenient reaction rate; and, at the other extreme, liquid fluoroalkyl alkylating agents can be used neat, without solvent. Too low a concentration of the alkylating agent causes incomplete or slow reaction; and when the concentration is too high, precipitation of the agent may occur. Too low a concentration of the alkylating agent causes inadequate surface fluorine content.

The polymer of this invention, which results from grafting fluoro alkyl moieties to the aforedefined aramid, can be in the form of a shaped article and has at least one repeating unit selected from,

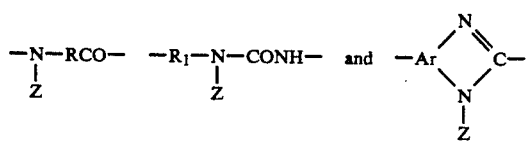

wherein

R is selected from $R^3$ and $R^1NHCOR^2$, $R^1$ and $R^3$, individually, are selected from m-phenylene, p-phenylene, 3,3'-biphenylene, 3,4'-biphenylene, 4,4'-biphenylene and 4,4'-diphenylene ether, $R^2$ is selected from $R^1$ and $(CH_2)_2$—, Ar is a trisubstituted aromatic radical in which two of the three radical bonds are adjacent to one another and attached to nitrogen atoms, x is 1 to 10, preferably 1 to 4; said repeating unit further optionally substituted with halogen or $C_yH_{2y+1}$ where y is 1 to 10. and Z is $R'(CH_2)_mX$ wherein:

R' is a perfluoroalkyl having 1-20 carbon atoms, straight-chain or branched, and substituted by one or more ether oxygens or not;

m is 0-6; and

X is

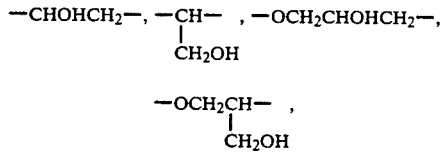

or —$C_6H_4CH_2$—.

X-ray photoelectron spectroscopy studies have shown that the surfaces of the fibers of poly(p-phenylene terephthalamide), after the alkylating treatment herein described, may have 1–8 atom percent fluorine and 2–4 atom percent $CF_3$. Those studies evidence that the $R'(CH_2)_m$ groups are covalently bonded to the polymer.

DESCRIPTION OF THE PREFERRED EMBODIMENTS

Example 1

In this example two types of para-aramid fabrics were treated by the process of this invention and then were tested for water repellency and the durability thereof. Fabric A in this example was a fabric utilized in fire fighting jackets and made from the para-aramid fiber sold by E. I. du Pont de Nemours and Company under the trademark designation Kevlar ® 100. Fabric B was a fabric utilized in ballistics garments and sold by E. I. du Pont de Nemours and Company under the trademark designation Kevlar ® 29. Fabric A was a 6 oz-/yd² plain weave, 35×35 yarn ends per inch, made from 660 denier yarn with 440 filaments. Fabric B was a 12 oz/yd² plain weave, 31×31 yarn ends per inch, made from 1000 denier yarn with 667 filaments. Each fabric was subjected to three tests, two utilizing fluoroalkyl alkylating agents within the embrace of this invention and one utilizing commercially available water repellency treatment as a control. In one of the tests utilizing the process of this invention, the fluoroalkyl alkylating agent was paraperfluorooctyl benzyl bromide; and, in the second test, the fluoroalkylating agent was para-trifluoromethyl benzyl bromide.

To treat the fabrics, 14.5 grams of a fabric were soaked for ten minutes in 30 ml of DMSO having a 0.20 molar concentration of potassium tert-butoxide and a 0.35 molar concentration of lithium nitrate at 25° C. The fabric was rinsed in DMSO and was then soaked for ten minutes in 300 ml of a solution containing 37.6 grams of the fluoroalkyl alkylating agent in 50:50, weight, DMSO and tetrahydrofuran. The fabric was rinsed in water and dried. The fabric exhibited excellent hydrophobicity.

The fabrics, once treated, were subjected to a laundering treatment which consisted of five consecutive washing cycles. Each cycle included a 12-minute agitated machine wash in water at a temperature of 105° F. with detergent, followed by a machine rinse and spin, and completed by tumble drying for 25 minutes at 155°-160° F.

The resulting fabrics were subjected to a Spray Test for Water Repellency (AATCC Test Method 22-1985). Test results are shown in Table 1.

TABLE 1

| Treatment Type | Spray Rating (0 is very wet; 100 is not wettable) | |
|---|---|---|
| | Before Wash | After 5 washes |
| Fabric A | | |
| $C_8F_{17}$-Benzyl Bromide | 90 | 70 |
| $CF_3$-Benzyl Bromide | 70 | 50 |
| Commercial treatment | 90-100 | 50 |
| Untreated | 0 | 0 |
| Fabric B | | |
| $C_8F_{17}$-Benzyl Bromide | 70 | 50 |
| $CF_3$-Benzyl Bromide | 70 | 0 |
| Commercial treatment | 100 | 90 |
| Untreated | 50 | 0 |

The commercially available water repellency treatment comprises coating the fabric by an aqueous dispersion of a hydrocarbon wax, a mixture of poly(perfluoroalkyl methacrylates), and an emulsifier; and, then, curing the material for a few minutes at about 380° degrees F.

Example 2

In this example, an additional sample of Fabric B from Example 1 was treated utilizing an epoxide-functional fluoroalkyl alkylating agent. The treatment and the treatment conditions were the same as were used in Example 1. The epoxide-functional alkylating agent was $CF_3$—$(CF_2)_5$—$CH_2$—$CH[O]CH_2/CF_3$—$(CF_2)_7$—$CH_2$—$CH[O]CH_2/CF_3$—$(CF_2)_9$—$CH_2$—$CH[O]CH_2$ sold by E. I. du Pont de Nemours and Company under the trademark designation Zonyl ® TE.

The fabrics were tested in accordance with MIL Spec MIL-C-44050A before washing and after washing. Results are shown in Table 2. The treatment of this invention resulted in a fabric exhibiting outstanding, durable, water repellency.

TABLE 2

| Test | This Invention | Military Spec | Commercial treatment |
|---|---|---|---|
| BEFORE WASH | | | |
| Water Spray Rating | 100 | $>/= 90$ | 100 |
| Oil Repellency Rating (higher is better) | 6 | $>/= 5$ | 5 |
| Dynamic Absorption (of water) | 8.2% | $</= 15\%$ | 8-10% |
| AFTER WASH | | | |
| Water Spray Rating | 90 | $>/= 80$ | 80 |
| Oil Repellency Rating (higher is better) | 6 | $>/= 5$ | 5 |
| Dynamic Absorption | 11.2% | $</= 15\%$ | 10-12% |

The shaped articles of this invention include the polymer described above with fluoroalkyl groups grafted thereto. The articles present water-repellent, oil-repellent, grafted surfaces; and, yet, the texture, the drape, and the hand of the articles is not altered from that of similar articles with ungrafted surfaces. The grafted surfaces are more durable than surfaces which have been merely coated with an agent because the grafted fluoroalkyl materials are covalently bonded to the polymer substrate of the article.

We claim:

1. A process for increasing the water repellency of shaped aramid articles selected from the group consisting of fibers, filaments, ribbons, tapes, rods, and particles while preventing the individual articles from adhering to one another during the process comprising the steps of:

a) contacting the aramid articles with a solution of:

i) an alkyl sulfoxide solvent;

ii) a base which has a $pK_a$ in the alkyl sulfoxide solvent of at least 19 in a concentration of 0.0001 to 6 molar in the solution; and iii) a lithium salt soluble in the solution in a concentration of 0.0001 to 6 molar in the solution and at a mole ratio of the lithium with the base of at least 1:1;

b) maintaining the contact for a time sufficient to swell the aramid articles and form anions on aramid molecules on the surface of the aramid articles;

c) contacting the aramid articles with a fluoroalkyl-containing alkylating agent $R'(CH_2)_mX$ wherein:

$R'$ is a perfluoroalkyl having 1-20 carbon atoms, straight-chain or branched, and substituted by one or more ether oxygens or not;

m is 0-6; and

X is $-CH[O]CH_2$, $-OCH_2CH[O]CH_2$, or $-C_6H_4CH_2CH_2Y$ wherein Y is Br, Cl, I, $CH_3C_6H_4SO_3$, or $CF_3SO_3$ whereby the alkylating agent is grafted to the aramid articles.

2. The process of claim 1 wherein the base is present in a concentration of 0.0001 to 6 molar in the solution.

3. The process of claim 1 wherein the lithium salt is present in a concentration of 0.0001 to 6 molar in the solution.

4. The process of claim 1 wherein the alkyl sulfoxide solvent is $R^4SOR^5$ wherein $R^4$ and $R^5$ are alkyl of 1-5 carbon atoms and can be the same or different or joined together to yield a cyclic-structure.

5. The process of claim 1 wherein the base is selected from the group consisting of potassium tert-butoxide, sodium methoxide, potassium hydroxide, and sodium amide.

6. The process of claim 1 wherein the fluoroalkyl-containing alkylating agent is perfluoroalkyl benzyl bromide wherein the alkyl is 1 to 10 carbon atoms.

7. The process of claim 1 wherein the fluoroalkyl-containing alkylating agent is fluoroalkyl epoxides wherein the alkyl is 1 to 10 carbon atoms.

8. The process of claim 1 wherein the aramid is poly(p-phenylene terphthalamide).

9. A water repellent shaped article made by the process of claim 1.

* * * * *